Aug. 30, 1960 W. SICHAK ET AL 2,951,152

RADIO DIVERSITY RECEIVING SYSTEM

Filed Feb. 21, 1958 3 Sheets-Sheet 1

Inventors
WILLIAM SICHAK
ROBERT T. ADAMS
By Alfred C. Hill
Agent

Inventors
WILLIAM SICHAK
ROBERT T. ADAMS
By Alfred C. Hill
Agent

Inventors
WILLIAM SICHAK
ROBERT T. ADAMS
By Alfred C. Hill
Agent 2,951,152

RADIO DIVERSITY RECEIVING SYSTEM

William Sichak, Nutley, and Robert T. Adams, Short Hills, N.J., assignors to International Telephone and Telegraph Corporation, Nutley, N.J., a corporation of Maryland Filed Feb. 21, 1958, Ser. No. 716,594

38 Claims. (Cl. 250—20)

Figure 1:
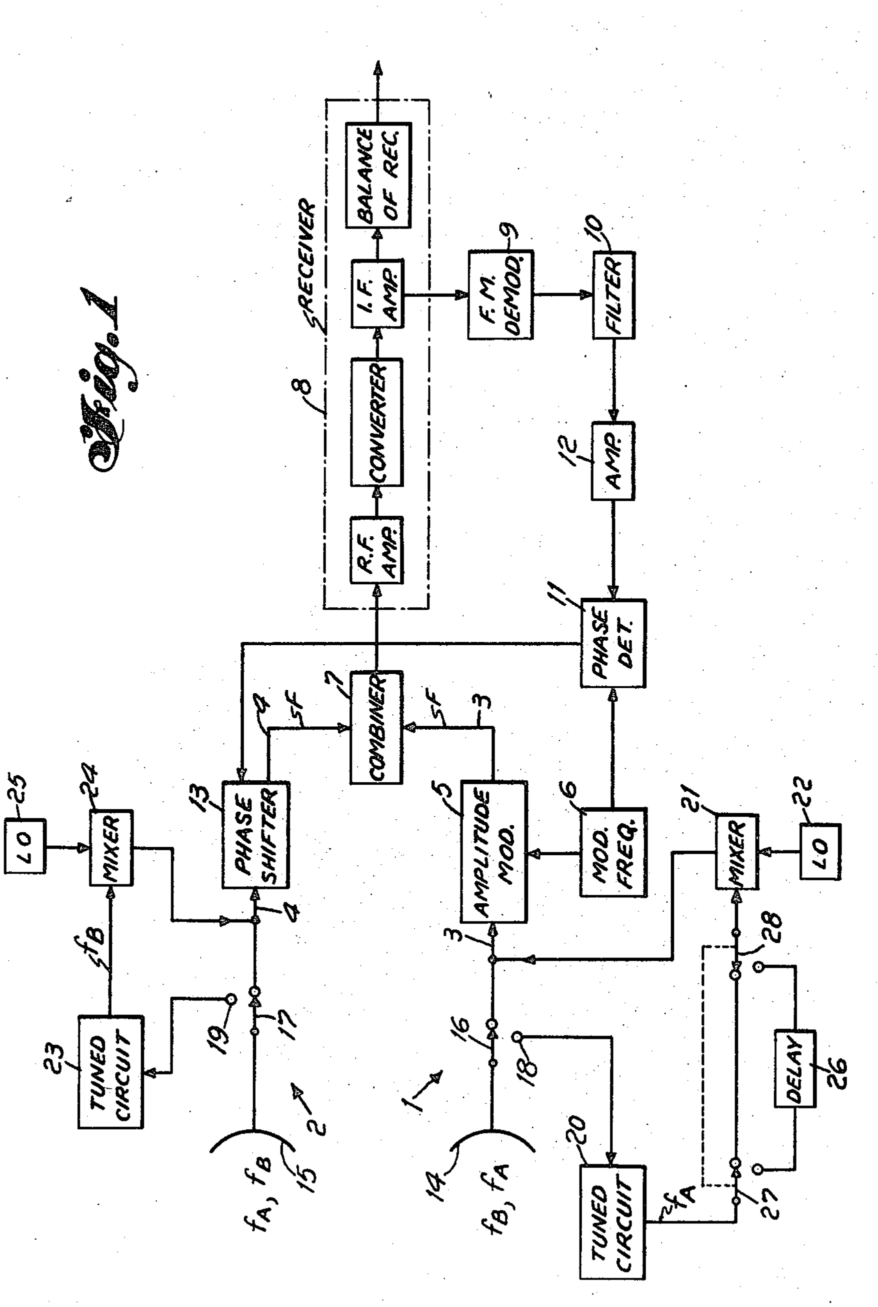

This invention relates to radio diversity receiving systems, and more particularly it relates to space, frequency and time diversity radio reception of modulated carrier waves, such as for example, amplitude, frequency or phase modulated carrier waves. This is a continuation-in-part of our copending application Serial No. 565,337, filed February 14, 1956, now abandoned.

One of the difficulties encountered in long distance radio systems is that of selective fading, generally regarded as resulting from the interference between those transmitted radio waves which have followed paths of appreciably different effective lengths. Heretofore this difficulty has been attacked by various forms of diversity reception. One such diversity arrangement is known as space diversity. In space diversity receiving systems in general, two or more separate antennas are spaced far enough apart at the receiving station to yield signals having different fading characteristics, that is, the signals fade independent of each other. Each antenna is then associated with a corresponding receiver or receiving channel. Automatic gain control voltages may be combined and used to control the gain of all receivers or receiving channels equally, and the output from the detector stage in each receiver or receiving channel is fed into a common circuit to be combined therein. This common circuit thus provides a single combined final output or a single combined signal.

Another diversity arrangement is known as frequency diversity. In frequency diversity systems in general, two or more carrier frequency signals are spaced far enough apart such that their fading characteristics are uncorrelated, that is, the signals fade independent of each other. Each of the frequency signals is coupled to a corresponding receiver or receiving channel. A common automatic gain control for the various receiver or receiving channels may also be employed with the output of the detector of each receiver or receiving channel being fed to a common circuit to be combined therein to provide a single output signal.

Still another diversity arrangement is known as time diversity. In time diversity systems in general, two or more carrier frequency signals are spaced relatively close to each other such that they are correlated, that is, they have substantially the same fading characteristics. These two frequency signals are delayed with respect to each other such that they become uncorrelated and hence have different fading characteristics. Each of these frequency signals is applied to corresponding receivers or receiving channels with the signals being delayed with respect to each other to return these signals to their original time coincident relationship. The signals then are operated on as in the case of frequency diversity to obtain a single combined signal.

In receiving frequency of similarly modulated waves or signals, it is desirable and usual, in practice, to apply limiting to the signal amplitude prior to the detector stage. If such an amplitude limiting is imposed on each of the receivers or receiving channels in a space, frequency or time diversity receiving system for frequency modulated waves, it is possible for a single channel, having a weak signal compared to the noise therein, to contribute a substantially large noise voltage to the combined signal output. In other words, any limitation of the strongest channel or channels tends to exaggerate the effects of the noise from the remaining channel or channels, and various devices and arrangements have been suggested to insure more effective diversity reception of frequency modulated waves. Some of these suggestions, while providing effective results under certain special conditions, tend to call for complicated design and operation but other such suggestions fail to provide, in practice, any very desirable results.

It will of course be recognized that the frequency modulated signals received in each channel of a space, frequency or time diversity radio receiving system should perferably be combined prior to detection in order to utilize at least common detection systems. In order to combine the signals in each channel prior to detection, it is necessary to insure that these signals have a common frequency, are substantially time coincident and are in phase so that the maximum additive effect is obtained. Moreover, if the signals in each channel are not in phase, a beat signal is produced and, therefore, it is necessary to maintain the signals in each channel substantially in phase.

One of the objects of this invention, therefore, is to provide an arrangement for combining a plurality of signals in phase at given circuit locations in a space, frequency or time diversity radio receiving system that will enable a minimum of duplicate equipment employed therein.

Another object of this invention is to provide an automatic phase control system to cause the phase of one signal to follow the phase changes present in another signal.

Still another object of this invention is to increase the reliability of a space, frequency or time diversity radio receiving system by employing an arrangement for combining a plurality of signals in phase at given circuit locations in said receiving system which enables a reduction in components therein subject to failure in operation.

A further object of this invention is to combine in phase a plurality of signals by frequency modulating one of the plurality of signals and varying the phase of the others of the plurality of signals in accordance with variations introduced into the frequency modulating signal by the phase relation of the signals being combined.

A feature of this invention is the provision of a space diversity receiving system in which a pair of spaced antennas each couples its output to a receiving channel. The signals in the channels are combined in an additive manner. The signal in one channel is modulated prior to the combining operation by a signal which will not interfere with or introduce distortion into the normal modulation of the received signals. The combined output is coupled to the common receiver equipment. A portion of the intermediate frequency signal of the common receiver equipment is coupled to a detector to detect variations in the introduced modulation component. The variation of the modulation component is a measure of the phase difference of the signals of each channel and is compared with the phase of the introduced modulation signal to produce a control voltage. The control voltage is coupled to adjust the phase of the signal of the other channel prior to the combining operation for phase coincidence of the signals of the receiving channels.

Another feature of this invention is the provision of a space diversity receiving system in which a pair of spaced antennas each couples its output to a radio frequency amplifier in an associated receiving channel. The signal received in one channel is mixed with a phase adjustable oscillating signal, and the signal of the other channel is mixed with a frequency modulated oscillating signal. The outputs of the mixers in each channel are combined in an additive manner. The combined output is coupled to common receiving equipment and is also detected for amplitude and/or phase variation of the frequency modulation component introduced by the frequency modulated oscillating signal. The variation of the modulation component is a measure of the phase difference of the signals of each channel and is compared with the modulating signal which modulates the oscillating source to produce a control voltage. The control voltage is coupled to adjust the phase of the phase adjustable oscillating signal for phase coincidence of the signals of the receiving channels.

Still another feature of this invention is the provision of a frequency diversity receiving system in which the frequency spaced signals are coupled to their corresponding receiving channels wherein the frequency spaced signals are converted to signals having a common frequency. The signals of the receiving channels are then operated on as described hereinabove with respect to the space diversity systems to combine these signals in phase coincidence.

A further feature of this invention is the provision of a time diversity receiving system in which the frequency spaced signals are coupled to their associate receiving channels wherein the frequency spaced signals are converted to signals having a common frequency. These common frequency signals are then operated on to render them time coincident. The signals of the receiving channels are then operated on as described hereinabove with respect to the space diversity systems to combine these signals in phase coincidence.

Still a further feature of this invention is the provision of an oscillating signal generating means including a variable oscillator as the source of the phase adjustable oscillating signal and a modulated oscillator as the source of the frequency modulated oscillating signal, the control voltage being coupled to said variable oscillator for maintenance of the desired phase coincidence.

Still another further feature of this invention is the provision of an oscillating signal generating means including a single oscillator having two outputs, one output being coupled to a phase shifter to provide the phase adjustable oscillating signal, and the other output being coupled to a frequency modulator to provide the frequency modulated oscillating signal, the control voltage being coupled to said phase shifter for maintenance of the desired phase coincidence.

Another feature of this invention is to amplitude modulate the signal of one receiving channel and detect the frequency modulations variations due to the phase difference between the output signals of the receiving channels. An alternative arrangement is to frequency modulate the signal of one receiving channel and detect the amplitude variations due to the phase difference between the output signals of the receiving channels.

Figure 2:
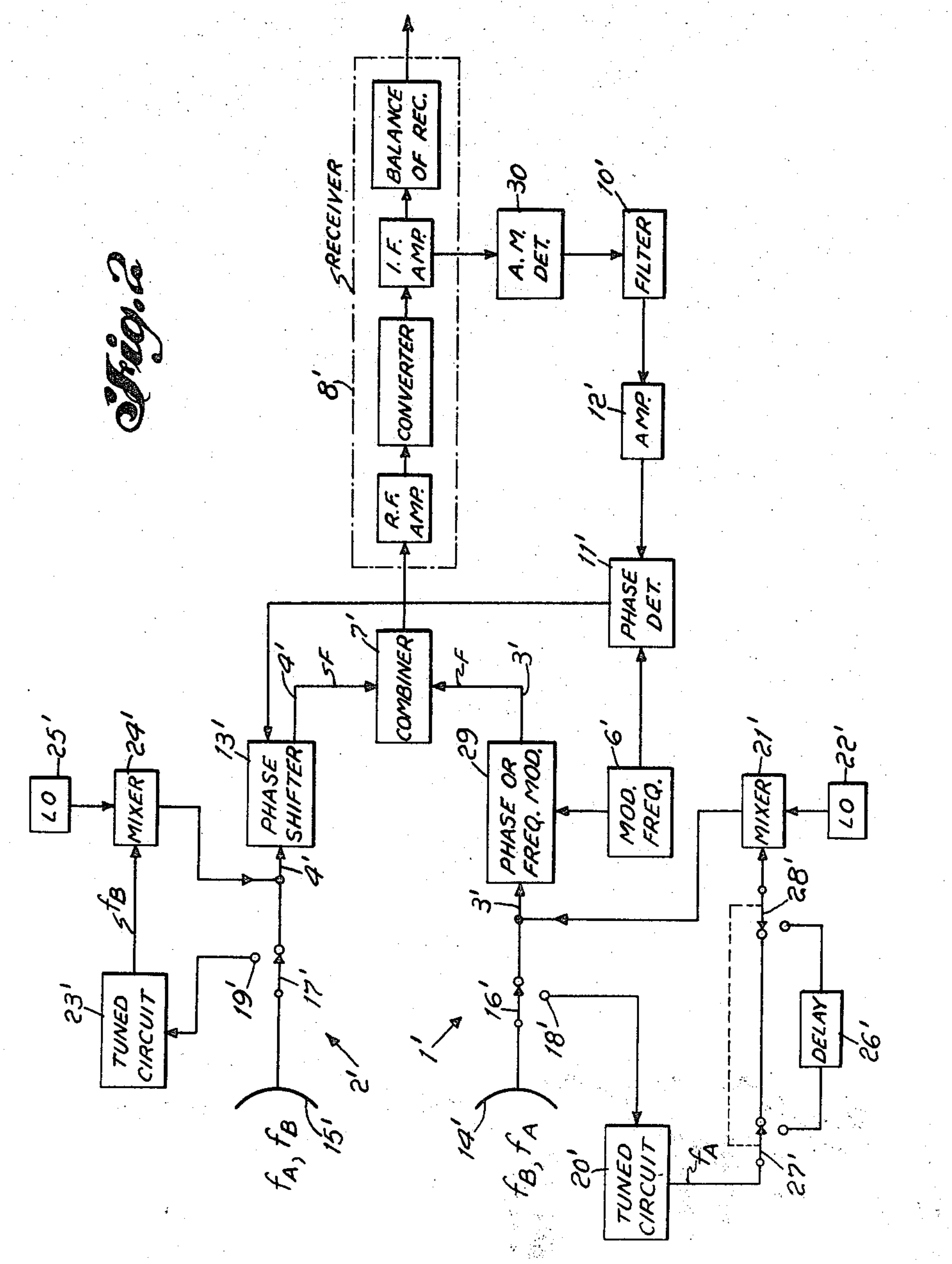
Figure 3:
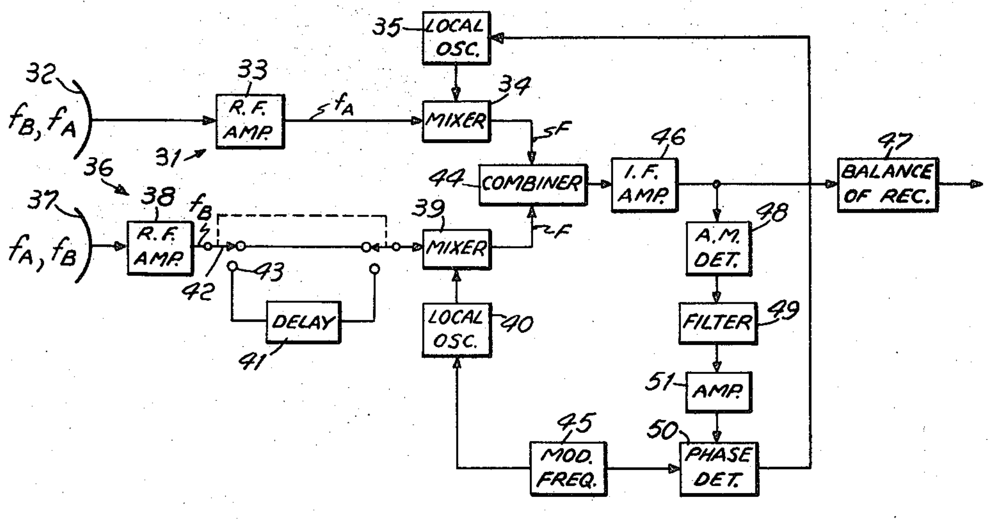
Figure 4:
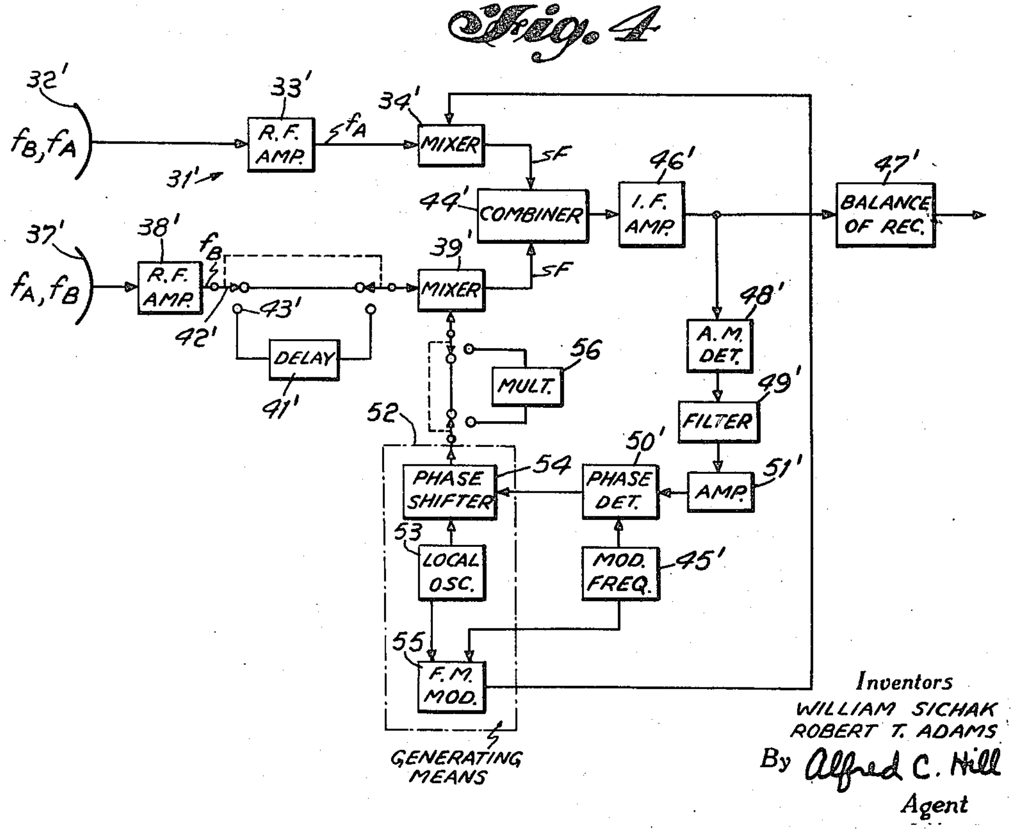

The above mentioned and other features and objects of this invention will become more apparent by reference to the following description taken in conjunction with the accompanying drawings, in which:

Fig. 1 illustrates a schematic diagram in block form of one embodiment of the automatic phase control system of this invention; and Figs. 2, 3, and 4 illustrate schematic diagrams in block form of alternate embodiments of the automatic phase control system of this invention.

Referring to Fig. 1, a schematic diagram in block form of one embodiment of the phase control system of this invention as incorporated in a space, frequency or time diversity receiving system is illustrated. A pair of receiving channels 1 and 2 respond to diversity signals and include components therein to produce signals of substantially the same frequency and having an unknown and varying phase relative to each other at the output thereof. The components employed in channels 1 and 2 will depend upon the type of diversity system which the phase control system of this invention is to be incorporated with but must be such as to produce signals having the same frequency at the outputs thereof. The phase control system will be discussed generally and then the components of the receiving channels will be discussed in connection with the various diversity systems with which this phase control system will operate as described.

The signal of channel 1 is coupled along transmission line 3 to amplitude modulator 5 wherein the received signal is amplitude modulated by the frequency of the modulation frequency source 6. The frequency signal of source 6 preferably has a value higher than the fading rate of the received signals and depends upon the type of communication being carried over the diversity system. For instance, for telephone channels arranged in the conventional frequency division multiplex, any frequency in the guard bands can be used, such as 3,500 cycles per second. For television, a frequency above the video band is suitable. Modulator 5 needs to produce only a small percentage of amplitude modulation of the received signal and can be an absorption device, such as a rotating variable attenuator, a ferrite modulator whose attenuation changes with applied magnetic field, or similar devices. It is preferably required, however, that the amplitude modulation produced be relatively pure because incidental frequency modulation will affect the balance indication. The output of amplitude modulator 5 is coupled to combiner 7 for addition to the signal coupled from channel 2 along transmission line 4. The combiner 7 is preferably a hybrid circuit to minimize interactions, but a simple T junction can also be used. The combined signal at the output of combiner 7 is fed to a conventional receiver 8 which is common to both received radio frequency signals.

When the signals at the output of transmission lines 3 and 4 are out-of-phase and the signal on transmission line 3 is amplitude modulated by the signal of source 6, the addition taking place in combiner 7 produces a resultant or combined signal which is frequency modulated in accordance with the frequency of the signal of source 6. The phase of the entire frequency modulated resultant signal, and hence, the phase of the frequency modulating signal component thereof, relative to the phase of the signal of source 6 is determined by the phase difference between the signals on transmission lines 3 and 4. The resultant signal is carried through receiver 8. A portion of the intermediate frequency signal is coupled to a frequency modulation demodulator 9 for detection of the frequency modulated components of the combined signal. This demodulator 9 may be a separate unit as illustrated or may be the existing demodulator in a receiver designed to receive frequency modulation. The output of demodulator 9 is coupled to a filter 10 which is used to select the frequency signal of source 6 including therein the phase variations introduced by the phase difference of the signals on transmission lines 3 and 4.

The filtered output is coupled to phase detector 11 by means of a transmission line or, as illustrated, an amplifier 12 when amplification is necessary. It is to be understood, however, that this amplfifier 12 need not be present in the detection system if the signal detected has sufficient level to drive the phase detector 11. A portion of the output of frequency source 6 is likewise fed to detector 11 wherein the filtered output of demodulator 9 is phase compared with respect to the phase of the signal of source 6. The output of phase detector 11 constitutes a control voltage which is used to control a continuous phase shifter 13 disposed in transmission line 4. Phase shifter 13 may be any of the known mechanical or electrical phase shifters. The action of phase shifter 13 is to adjust the phase of the signal at the output of channel 2 to coincide with the phase of the signal at the output of channel 1 so that the maximum additive effect of the two signals is obtained in combiner 7 and, furthermore, so that a beat signal is not produced in receiver 8 due to an out of phase relation between the two combined signals.

The amplitude and phase at the output of demodulator 9 at the modulating signal frequency depends on the phase difference between the two channel signals. If the phase difference is zero or 180 degrees out of phase, there is no output from demodulator 9. If the phase difference is 90 degrees or 270 degrees, the amplitude output of demodulator 9 is relatively large, but differs in phase by 180 degrees. The desired condition obviously is that of zero phase difference where the maximum additive effect is achieved in combiner 7. The control voltage of detector 11 and the phase shifter 13 are so arranged to drive the phase shifter 13 in one direction with a positive voltage out of the phase detector and in the opposite direction with a negative voltage output to enable the adjustment thereof to bring the output signal of channel 2 in phase coincidence with the output signal of channel 1.

As mentioned hereinabove, the phase control system of this invention will operate as described with any type diversity system provided the output signal of each of channels 1 and 2 have the same frequency.

In a space diversity system this is accomplished by employing two antennas disposed at spaced locations to receive signals of the same frequency which have traversed paths of different effective lengths. As illustrated in Fig. 1, channels 1 and 2 include antennas 14 and 15, respectively, disposed at spaced locations and the signals, $f_A$ and $f_B$, respectively, induced in antennas 14 and 15 have the same frequency. Hence, by positioning switches 16 and 17 in the illustrated position, the common frequency signals induced in antennas 14 and 15 are coupled directly to transmission lines 3 and 4 of channels 1 and 2, respectively.

In a frequency diversity system, the fading characteristics are minimized by transmitting signals of different frequencies, $f_A$ and $f_B$, which are spaced sufficiently so that the signals are uncorrelated. For employment with this type of diversity system, the receiving system would be arranged as illustrated with switches 16 and 17 positioned to make contact with contacts 18 and 19. Hence, channel 1 would include antenna 14, tuned circuit 20, tuned to frequency $f_A$, mixer 21 and local oscillator 22, while channel 2 would include antenna 15, tuned circuit 23, tuned to frequency $f_B$, mixer 24 and local oscillator 25. The tuned circuits 20 and 23 operate to select the appropriate signal for conduction along channels 1 and 2 while the frequency converting portion of channel 1, mixer 21, oscillator 22 and the frequency converting portion of channel 2, mixer 24, oscillator 25, cooperate to produce in transmission lines 3 and 4 signals having the same frequency F. From this point on the phase control circuit will operate as described above to provide phase coincidence between the output signals of channels 1 and 2.

While we have described above that the channels 1 and 2 each include a frequency converting portion, it should be recognized that only one channel need include this frequency converting portion. For instance, the channel carrying the higher frequency received signal could include the frequency converting portion to reduce the higher frequency to a value equal to the lower frequency. It should also be recognized that in a frequency diversity system it is not necessary to space antennas 14 and 15 and in fact that one antenna connected to channels 1 and 2 would suffice.

In a time diversity system, the fading characteristics are minimized by transmitting two correlated, frequency separated signals which are spaced in time to render these signals uncorrelated. As in the case of a frequency diversity receiving system, channels 1 and 2 include an arrangement to convert the frequency spaced signal to signals at the outputs thereof having the same frequency. Hence, switches 16 and 17 are moved to contacts 18 and 19 to include the frequency converting portions of each channel. It is to be understood, however, that the frequency converting portion of only one channel may be required. In addition, at least one of the receiving channels must include a time delay means to render the received signals time coincident. As illustrated in Fig. 1, it has been assumed that at the transmitter signal, $f_B$ was delayed with respect to signal $f_A$. Therefore, in channel 1 which is responsive to signal $f_A$, a delay means 26, of proper time delay, is inserted in channel 1 by the proper positioning of switches 27 and 28 to cause signals $f_A$ and $f_B$ to be time coincident. Thus, employing these components in channels 1 and 2, the phase control system will operate as described hereinabove in a time diversity receiving system.

It will be immediately recognized that the output signals of channels 1 and 2, particularly in a space diversity system, but not necessarily limited thereto, may be combined at the radio frequency level and the phase thereof adjusted prior to combining the two signals at this radio frequency level. The circuit described in connection with Fig. 1 and hereinbelow with respect to Fig. 2 enables a reduction in the duplicate equipment heretofore employed to combine the received signals.

Referring to Fig. 2, there is illustrated a schematic diagram in block form of an alternative embodiment of the phase control system of this invention as incorporated in a space, frequency or time diversity receiving system which is substantially identical both in theory of operation and circuitry as the embodiment described in connection with Fig. 1, and the same reference characters will be employed to indicate identical equipment. The difference between the circuit of Figs. 1 and 2 is in the type of modulation applied to one of the channel output signals and the detector employed to cooperate in achieving the desired phase shift of the other channel output signal for phase coincidence of the channel signals prior to the combining thereof.

The system of Fig. 2 comprises a pair of receiving channels 1′ and 2′ responsive to diversity signals whether of the spaced, frequency or time diversity type to produce an output having the same frequency for coupling along transmission lines 3′ and 4′ to a signal combiner 7′. The output signal of channel 1′ is phase or frequency modulated by modulator 29 in accordance with the frequency signal of source 6′. As before, the signal of modulating source 6′ is of such a value as not to interfere with the normal modulation carried on the received radio frequency signal. When the signals at the output of transmission lines 3′ and 4′ are out-of-phase and the signal on transmission line 3′ is frequency or phase modulated by the signal of source 6′, the addition taking place in combiner 7′ produces a resultant or combined signal which is amplitude modulated in accordance with the signal of source 6′. The phase of the entire amplitude modulated resultant signal, and hence, the phase of the amplitude modulating signal component thereof, relative to the phase of the signal of source 6′ is determined by the phase difference between the signals on transmission lines 3′ and 4′. The resultant signal is coupled to the common receiving equipment 8′. A portion of the intermediate frequency signal of receiver 8′ is coupled to amplitude detector 30 which detects the amplitude modulated components in the combined signal phase shifted with respect to the signal of source 6′ due to the phase difference of the signals being combined. As before, filter 10′ selects the frequency output of detector 30 corresponding to the frequency of source 6′ for coupling to phase detector 11′. A portion of the output of source 6′ is coupled to the phase detector 11′ for comparison with the output of detector 30 to develop a control voltage for operation upon phase shifter 13′ to adjust the phase of the signal output of channel 2′ to cause phase coincidence between the signals on transmission lines 3′ and 4′ prior to the combining operation of combiner 7′.

Referring to Fig. 3, a schematic diagram in block form of another embodiment of the phase control system of this invention as incorporated in any type diversity receiving system is illustrated. The system about to be described is analogous to the systems of Figs. 1 and 2. However the modulation of the signal of one receiving channel and the phase adjustment of the signal of the other channel are accomplished through the converting means of the receiving channels illustrated to produce in each channel a difference or intermediate frequency signals, said intermediate frequency signals having the same tenquency. The equal frequency difference frequency signals are then combined. The theory of operation of the phase control is substantially identical with Figs. 1 and 2 but is accomplished by employing different means.

Receiving channel 31 is illustrated as including as components thereof antenna 32, radio frequency amplifier 33, mixer 34, and a phase adjustable local oscillator 35. Receiving channel 36 is illustrated as including as components thereof antenna 37, radio frequency amplifier 38, mixer 39, and local oscillator 40. Regardless of the diversity system these receiving channels 31 and 36 are employed in, the components thereof cooperate to produce at the outputs thereof signals having the same frequency and with unknown and varying phase relative to each other.

In space diversity systems the antennas 32 and 37 are spaced sufficiently far apart so that the equal frequency signals ($f_A=f_B$) induced therein have different fading characteristics. Amplifiers 33 and 38 are tuned to the same frequency, and the oscillations of oscillators 35 and 40 have the same frequency. This results in an intermediate frequency signal at the output of channels 31 and 36 having the same frequency.

In frequency diversity systems the antennas 32 and 37 in close physical proximity, or a single antenna common to the inputs to channels 31 and 36, injects into the channels 31 and 36 the uncorrelated frequency spaced signals $f_A$ and $f_B$. Amplifier 33, tuned to $f_A$, will pass to the remainder of channel 31 signal $f_A$, while amplifier 38 tuned to $f_B$, will pass to the remainder of channel 36 signal $f_B$. Oscillators 35 and 40 will then be adjusted to have their frequencies of such values that the output of their respective mixers, mixers 34 and 39, will be an intermediate frequency signal having the same frequency.

In a time diversity system, the components of channels 31 and 36 are adjusted and operated as described above with respect to frequency diversity systems to produce an output signal from each channel having the same frequency. In addition, the signal of at least one of the channels is passed through a delay means, such as delay means 41 by operation of switch 42 to position 43, to render the signals of the two channels, $f_A$ and $f_B$, time coincident.

Regardless of the diversity system in which our phase control system is employed, the operation thereof is as follows. A pair of channels 31 and 36 have signals induced therein for coupling respectively to radio frequency amplifiers 33 and 38 for presentation of the appropriate frequency signal to mixers 34 and 39, respectively. The radio frequency signal coupled to mixer 30 is beat with an oscillating signal from an oscillating signal generating means including as a portion thereof a phase adjustable oscillator 35. The intermediate frequency produced at the output of mixer 34 is coupled to combiner 44. The input to channel 36 is beat with a frequency modulated oscillating signal from another portion of the oscillating signal generating means identified as local oscillator 40 to provide at the output of mixer 39 an intermediate frequency signal having a center frequency equal to the frequency at the output of mixer 34 and modulated in accordance with the frequency of the signal of source 45. Thus, the signal of channel 36 is frequency modulated at a frequency chosen not to interfere with the normal output of the receiver and is reduced to a difference frequency through the action of mixer 39 and local oscillator 40 to be combined with the output of mixer 34 for coupling to an intermediate frequency amplifier 46. The output of amplifier 46 is coupled to the balance of the common receiver 47, and a portion thereof is coupled to an amplitude modulation detector 48 to detect the amplitude modulation of the intermediate frequency signal introduced by the modulating signal of source 45 having a frequency equal to the frequency of the signal of source 45 and a phase relative to the phase of the signal of source 45 determined by the phase difference between the output signals of channels 31 and 36. The filter 49 assures that only the signal of source 45 is fed to phase detector 50 by means of a direct coupling therebetween or, where necessary, an amplifier 51. A portion of the frequency source 45 is coupled to phase detector 50 for phase comparison between the two signals coupled thereto to produce a control voltage in accordance with the phase variations in the modulating signal produced by the phase difference of the signals at the outputs of channels 31 and 36. The control voltage of detector 50 is coupled to the local oscillator 35, a portion of the oscillating signal generating means, to adjust the phase thereof and, hence, the phase of the output of mixer 34 to maintain phase coincidence between the signals combined in combiner 44.

As was the case in the previous two embodiments, the filtered output of detector 48 is zero when the phase difference between the two received signals is zero or 180 degrees and a maximum but with opposite phase when the phase difference is 90 degrees or 270 degrees. It is obvious that the desired condition is the zero phase difference where the maximum additive effect is achieved. The local oscillator 35 and the phase adjustment thereof are so arranged to adjust the phase in one direction with a positive voltage out of detector 50 and in the opposite direction with a negative voltage output.

Referring to Fig. 4, a schematic diagram in block form of still another embodiment of the phase control system of this invention as incorporated in a space, frequency or time diversity receiving system is illustrated which is substantially identical to the system of Fig. 3 with the exception of the oscillating signal generator means, similar portions of Fig. 4 being identified with reference characters similar to those used in Fig. 3.

The oscillating signal generator means 52 is shown to include a local oscillator 53 having two outputs, one of which is coupled to a phase shifter 54 to provide a phase adjustable oscillating signal for coupling to mixer 39′ and a second output coupled to modulator 55 to provide a frequency modulated oscillating signal for coupling to mixer 34′. The input to channel 31′ is coupled to mixer 34′ for beating with a frequency modulating oscillating signal to produce a difference frequency for coupling to combiner 44′. The frequency at which the oscillating signal is modulated is established by source 45′ coupled to the modulator 55. The adding of the equal frequency outputs of mixers 34′ and 39′ produces an amplitude modulated combined signal, the amplitude modulating component thereof having a frequency equal to the frequency of the signal of source 45 and a phase relative to the phase of the signal of source 45′ determined by the phase difference between the signal outputs of mixers 34′ and 39′. The modulating signal of the combined signal output is detected by detector 48′ and filter 49′ for coupling to the phase detector 50′ which compares the phase of the detected modulating signal and the phase of the original modulating signal to produce a control voltage in accordance with the phase difference between signals at the outputs of mixers 34′ and 39′. This control voltage is coupled to phase shifter 34 to adjust the phase of the phase adjustable oscillating signal in a manner to cause phase coincidence between the difference frequency signals prior to combining in combiner 44'.

To cooperate in producing identical frequency signals at the output of mixers 34' and 39' in frequency and time diversity systems, it will be necessary to connect a frequency multiplier in at least one of the output paths of oscillator 53, as shown at 56, so that the oscillator frequency into mixer 34' and the oscillator frequency into mixer 39' will cooperate with the frequency of the signals coupled thereto along channels 31' and 36' to produce signal outputs from mixers 34' and 39' which have the same center frequency.

While we have described above the principles of our invention in connection with specific apparatus, it is to be clearly understood that this description is made only by way of example and not as a limitation to the scope of our invention as set forth in the objects thereof and in the accompanying claims.

We claim:

1. An automatic phase control system comprising a first and second source of signals of substantially the same frequency and having an unknown and varying phase relative to each other, means to combine signals of said first and second sources, a third source of given signals, means responsive to the output of said third source to modulate the signals of one of said first and second sources prior to the combining thereof, detector means coupled to the output of said combiner means to detect the signals of said third source therein, said detected signals having variations therein according to the phase difference between the signals of said first and second sources, a phase comparison means coupled to the output of said detector means and the output of said third source to produce a control signal in accordance with said variations and means responsive to said control signal to vary the phase of the signals of the other of said first and second sources prior to the combining thereof to maintain the signals combined substantially in phase.

2. An automatic phase control system comprising a first and second source of signals of substantially the same frequency and having an unknown and varying phase relative to each other, means to combine signals of said first and second sources, a third source of given signals, an amplitude modulator coupled between one of said first and second sources and said combiner means to modulate the signals of said one of said first and second sources in accordance with the output of said third source, detector means coupled to the output of said combiner means to detect the signals of said third source therein, said detected signals having variations therein according to the phase difference between the signals of said first and second sources, a phase comparison means coupled to the output of said detector means and the output of said third source to produce a control signal in accordance with said variations and means responsive to said control signal to vary the phase of the signals of the other of said first and second sources prior to the combining thereof to maintain the signals combined substantially in phase.

3. An automatic phase control system comprising a first and second source of signals of substantially the same frequency and having an unknown and varying phase relative to each other, means to combine signals of said first and second sources, a third source of given signals, an amplitude modulator coupled between one of said first and second sources and said combiner means to modulate the signals of said one of said first and second sources in accordance with the output of said third source, a frequency modulation demodulator coupled to the output of said combiner means and a filter coupled in series with said demodulator, said filter and said demodulator cooperating to detect the signals of said third source therein, said detected signals having variations therein according to the phase difference between the signals of said first and second sources, a phase comparison means coupled to the output of said filter and the output of said third source to produce a control signal in accordance with said variations and means responsive to said control signal to vary the phase of the signals of the other of said first and second sources prior to the combining thereof to maintain the signals combined substantially in phase.

4. An automatic phase control system comprising a first and second source of signals of substantially the same frequency and having an unknown and varying phase relative to each other, means to combine signals of said first and second sources, a third source of given signals, an amplitude modulator coupled between one of said first and second sources and said combiner means to modulate the signals of said one of said first and second sources in accordance with the output of said third source, a frequency modulation demodulator coupled to the output of said filter and said demodulator cooperating to detect the signals of said third source therein, said detected signals having variations therein according to the phase difference between the signals of said first and second sources, a phase comparison means coupled to the output of said filter and the output of said third source to produce a control signal in accordance with said variations and a phase shifter coupled between the other of said first and second sources and said combiner means to vary the phase of the signals of said other of said first and second sources to maintain the signals combined substantially in phase.

5. An automatic phase control system comprising a first and second source of signals of substantially the same frequency and having an unknown and varying phase relative to each other, means to combine signals of said first and second sources, a third source of given signals, a frequency modulator coupled between one of said first and second sources and said combiner means to modulate the signals of said one of said first and second sources in accordance with the output of said third source, an amplitude modulation detector coupled to the output of said combiner means and a filter coupled in series with said detector, said filter and said detector cooperating to detect the signals of said third source therein, said detected signals having variations therein according to the phase difference between the signals of said first and second sources, a phase comparison means coupled to the output of said filter and the output of said third source to produce a control signal in accordance with said variations and a phase shifter coupled between the other of said first and second sources and said combiner means to vary the phase of the signals of said other of said first and second sources to maintain the signals combined substantially in phase.

6. An automatic phase control system comprising a first and second source of signals of substantially the same frequency and having an unknown and varying phase relative to each other, means to combine signals of said first and second sources, a third source of given signals, a frequency modulator coupled between one of said first and second sources and said combiner means to modulate the signals of said one of said first and second sources in accordance with the output of said third source, detector means coupled to the output of said combiner means to detect the signals of said third source therein, said detected signals having variations therein according to the phase difference between the signals of said first and second sources, a phase comparison means coupled to the output of said detector means and the output of said third source to produce a control signal in accordance with said variations and means responsive to said control signal to vary the phase of the signals of the other of said first and second sources prior to the combining thereof to maintain the signals combined substantially in phase.

7. An automatic phase control system comprising a first and second source of signals of substantially the same frequency and having an unknown and varying phase relative to each other, means to combine signals of said first and second sources, a third source of given signals, a frequency modulator coupled between one of said first and second sources and said combiner means to modulate the signals of said one of said first and second sources in accordance with the output of said third source, an amplitude modulation detector coupled to the output of said combiner means and a filter coupled in series with said detector, said filter and said detector cooperating to detect the signals of said third source therein, said detected signals having variations therein according to the phase difference between the signals of said first and second sources, a phase comparison means coupled to the output of said filter and the output of said third source to produce a control signal in accordance with said variations and means responsive to said control signal to vary the phase of the signals of the other of said first and second source prior to the combining thereof to maintain the signals combined substantially in phase.

8. A diversity receiving system comprising a plurality of antennas located at different points in space, means coupled to each of said antennas to combine the signals induced in each of said antennas, a source of given signals, means responsive to the output of said source to modulate the induced signals of one of said antennas prior to combining thereof, detector means coupled to the output of said combiner means to detect the signals of said source therein, said detected signals having variations therein according to the phase difference between the induced signals of said antennas, a phase comparison means coupled to the output of said detector means and the output of said source to produce a control signal in accordance with said variations and means responsive to said control signal to vary the phase of the induced signals of the others of said antennas prior to the combining thereof to maintain the signals combined substantially in phase.

9. A diversity receiving system comprising a plurality of antennas located at different points in space, means coupled to each of said antennas to combine the signals induced in each of said antennas, a source of given signals, an amplitude modulator coupled between one of said antennas and said combiner means to modulate the induced signals of said one of said antennas in accordance with the output of said source, detector means coupled to the output of said combiner means to detect the signals of said source therein, said detected signals having variations therein according to the phase difference between the induced signals of said antennas, a phase comparison means coupled to the output of said detector means and the output of said source to produce a control signal in accordance with said variations and means responsive to said control signal to vary the phase of the induced signals of the others of said antennas prior to the combining thereof to maintain the signals combined substantially in phase.

10. A diversity receiving system comprising a plurality of antennas located at different points in space, means coupled to each of said antennas to combine the signals induced in each of said antennas, a source of given signals, an amplitude modulator coupled between one of said antennas and said combiner means to modulate the induced signals of said one of said antennas in accordance with the output of said source, a frequency modulation demodulator coupled to the output of said combiner means and a filter coupled in series with said demodulator, said filter and said demodulator cooperating to detect the signals of said source therein, said detected signals having variations therein according to the phase difference between the induced signals of said antennas, a phase comparison means coupled to the output of said filter and the output of said source to produce a control signal in accordance with said variations and means responsive to said control signal to vary the phase of the induced signals of the others of said antennas prior to the combining thereof to maintain the signals combined substantially in phase.

11. A diversity receiving system comprising a plurality of antennas located at different points in space, means coupled to each of said antennas to combine the signals induced in each of said antennas, a source of given signals, an amplitude modulator coupled between one of said antennas and said combiner means to modulate the induced signals of said one of said antennas in accordance with the output of said source, a frequency modulation demodulator coupled to the output of said combiner means and a filter coupled in series with said demodulator, said filter and said demodulator cooperating to detect the signals of said source therein, said detected signals having variations therein according to the phase difference between the induced signals of said antennas, a phase comparison means coupled to the output of said filter and the output of said source to produce a control signal in accordance with said variations and a phase shifter coupled between the others of said antennas and said combiner means to vary the phase of the induced signals of said others of said antennas to maintain the signals combined substantially in phase.

12. A diversity receiving system comprising a plurality of antennas located at different points in space, means coupled to each of said antennas to combine the signals induced in each of said antennas, a source of given signals, a frequency modulator coupled between one of said antennas and said combiner means to modulate the induced signals of said one of said antennas in accordance with the output of said source, an amplitude modulation detector coupled to the output of said combiner means and a filter coupled in series with said detector, said filter and said detector cooperating to detect the signals of said source therein, said detected signals having variations therein according to the phase difference between the induced signals of said antennas, a phase comparison means coupled to the output of said filer and the output of said source to produce a control signal in accordance with said variations and a phase shifter coupled between the others of said antennas and said combiner means to vary the phase of the induced signals of said others of said antennas to maintain the signals combined substantially in phase.

13. A diversity receiving system comprising a plurality of antennas located at different points in space, means coupled to each of said antennas to combine the signals induced in each of said antennas, a source of given signals, a frequency modulator coupled between one of said antennas and said combiner means to modulate the induced signals of said one of said antennas in accordance with the output of said source, detector means coupled to the output of said combiner means to detect the signals of said source therein, said detected signals having variations therein according to the phase difference between the induced signals of said antennas, a phase comparison means coupled to the output of said detector means and the output of said source to produce a control signal in accordance with said variations and means responsive to said control signal to vary the phase of the induced signals of the others of said antennas prior to the combining thereof to maintain the signals combined substantially in phase.

14. A diversity receiving system comprising a plurality of antennas located at different points in space, means coupled to each of said antennas to combine the signals induced in each of said antennas, a source of given signals, a frequency modulator coupled between one of said antennas and said combiner means to modulate the induced signals of said one of said antennas in accordance with the output of said source, an amplitude modulation detector coupled to the output of said combiner means and a filter coupled in series with said detector, said filter and said detector cooperating to detect the signals of said source therein, said detected signals having variations therein according to the phase difference between the induced signals of said antennas, a phase comparison means coupled to the output of said filter and the output of said source to produce a control signal in accordance with said variations and means responsive to said control signal to vary the phase of the induced signals of the others of said antennas prior to the combining thereof to maintain the signals combined substantially in phase.

15. An automatic phase control system comprising a first and second source of signals of substantially the same frequency and having an unknown and varying phase relation to each other, generating means to produce two oscillating signals, first mixing means to mix the output of said first source of signals and one of the oscillating signals of said generating means to produce a first difference signal, second mixing means to mix the output of said second source of signals and the other oscillating signal of said generating means to produce a second difference signal, means coupled to said mixing means to combine said difference signals, a third source of given signals coupled to said generating means to modulate said one of the oscillating signals, detector means coupled to the output of said combiner means to detect the signals of said third source, said detected signals having variations therein according to the phase difference between the signals of said first and second sources, a phase comparison means coupled to the output of said detector means and the output of said third source to produce a control signal in accordance with said variations and means to couple said control signal to said generating means to vary the phase of said other of the oscillating signals to maintain said first and second difference signals substantially in phase.

16. An automatic phase control system comprising a first and second source of signals of substantially the same frequency and having an unknown and varying phase relation to each other, two oscillators, first mixing means to mix the output of said first source of signals and the output signals of one of said oscillators to produce a first difference signal, second mixing means to mix the output of said second source of signals and the output signals of the other of said oscillators to produce a second difference signal, means coupled to said mixing means to combine said difference signals, a third source of given signals coupled to said one of said oscillators to modulate the output signals thereof, detector means coupled to the output of said combiner means to detect the signals of said third source, said detected signals having variations therein according to the phase difference between the signals of said first and second sources, a phase comparison means coupled to the output of said detector means and the output of said third source to produce a control signal in accordance with said variations and means to couple said control signal to said other of said oscillators to vary the phase of the output signals thereof to maintain said first and second difference signals substantially in phase.

17. An automatic phase control system comprising a first and second source of signals of substantially the same frequency and having an unknown and varying phase relation to each other, an oscillator having two oscillating outputs, a phase shifter coupled to one oscillating output of said oscillator, a modulator coupled to the other oscillating output of said oscillator, first mixing means to mix the output of said first source of signals and the output of said phase shifter to produce a first difference signal, second mixing means to mix the output of said second source of signals and the output of said modulator to produce a second difference signal, means coupled to said mixing means to combine said difference signals, a third source of given signals coupled to said modulator to modulate said other oscillating output, detector means coupled to the output of said combiner means to detect the signals of said third source, said detected signals having variations therein according to the phase difference between the signals of said first and second sources, a phase comparison means coupled to the output of said detector means and the output of said third source to produce a control signal in accordance with said variations and means to couple said control signal to said phase shifter to vary the phase of said one oscillating output to maintain said first and second difference signals substantially in phase.

18. A diversity receiving system comprising a plurality of antennas located at different points in space, a radio frequency amplifier coupled to each of said antennas to amplify the radio signals induced in each of said antennas, generating means to produce two oscillating signals, first mixing means to mix the output of one of said radio frequency amplifiers and one of the oscillating signals of said generating means to produce a first difference signal, second mixing means to mix the output of the other of said radio frequency amplifiers and the other oscillating signal of said generating means to produce a second difference signal, means coupled to said mixing means to combine said difference signals, a source of given signals coupled to said generating means to modulate said one of the oscillating signals, detector means coupled to the output of said combiner means to detect the signals of said source, said detected signals having variations therein according to the phase difference between said radio signals, a phase comparison means coupled to the output of said detector means and the output of said source to produce a control signal in accordance with said variations and means to couple said control signal to said generating means to vary the phase of said other of the oscillating signals to maintain said first and second difference signals substantially in phase.

19. A diversity receiving system comprising a plurality of antennas located at different points in space, a radio frequency amplifier coupled to each of said antennas to amplify the radio signals induced in each of said antennas, two oscillators, first mixing means to mix the output of one of said radio frequency amplifiers and the output signals of one of said oscillators to produce a first difference signal, second mixing means to mix the output of the other of said radio frequency amplifiers and the output signals of the other of said oscillators to produce a second difference signal, means coupled to said mixing means to combine said difference signals, a source of given signals coupled to said one of said oscillators to frequency modulate the output signals thereof, an amplitude detector means coupled to the output of said combiner means to detect the signals of said source, said detected signals having variations therein according to the phase difference between said radio signals, a phase comparison means coupled to the output of said detector means and the output of said source to produce a control signal in accordance with said variations and means to couple said control signal to said other of said oscillators to vary the phase of the output signals thereof to maintain said first and second difference signals substantially in phase.

20. A diversity receiving system comprising a plurality of antennas located at different points in space, a radio frequency amplifier coupled to each of said antennas to amplify radio signals induced in each of said antennas, an oscillator having two oscillating outputs, a phase shifter coupled to one oscillating output of said oscillator, a modulator coupled to the other oscillating output of said oscillator, first mixing means to mix the output of one of said radio frequency amplifiers and said phase shifter to produce a first difference signal, second mixing means to mix the output of the other of said radio frequency amplifiers and said modulator to produce a second difference signal, means coupled to said mixing means to combine said difference signals, a source of given signals coupled to frequency modulate said other oscillating output, an amplitude detector means coupled to the output of said combiner means to detect the signals of said source, said detected signals having variations therein according to the phase difference between said radio signals, a phase comparison means coupled to the output of said detector means and the output of said source to produce a control signal in accordance with said variations and means to couple said control signals to said phase shifter to vary the phase of said one oscillating output to maintain said first and second difference signals substantially in phase.

21. An automatic phase control system comprising a first and second source of signals of substantially the same frequency and having an unknown and varying phase relative to each other, means to combine signals of said first and second sources, a third source of given signals, means responsive to the output of said third source to modulate the signals of one of said first and second sources prior to combining thereof, detector means coupled to the output of said combiner means to detect the signals of said third source therein, said detected signals having variations therein according to the phase difference between the signals of said first and second sources, a phase comparison means coupled to the output of said detector means and the output of said third source to produce a control voltage in accordance with said variaitons and means responsive to said control signal to vary the relative phase of the signals of said first and second sources prior to the combining thereof to maintain the signals combined substantially in phase.

22. A diversity receiving system comprising a plurality of receiving channels, the output signals of each of said channels being equal in frequency, means coupled to the output of each of said channels to combine the output signals of each of said channels, a source of given signals, means responsive to the output of said source to modulate the signal of one of said channels prior to combining thereof, detector means coupled to the output of said combiner means to detect the signals of said source therein, said detected signals having variations therein according to the phase difference between the output signals of said channels, a phase comparison means coupled to the output of said detector means and the output of said source to produce a control signal in accordance with said variations and means responsive to said control signal to vary the phase of the signals of the others of said channels prior to the combining thereof to maintain the signals combined substantially in phase.

23. A diversity receiving system comprising a plurality of receiving channels, means included in each of said channels to render each of said channels responsive to a different one of a plurality of signals spaced in frequency, a frequency converting means included in at least one of said channels to render the output signals of each of said channels equal in frequency, means coupled to the output of each of said channels to combine the output signals of each of said channels, a source of given signals, means responsive to the output of said source to modulate the signals of one of said channels prior to combining thereof, detector means coupled to the output of said combiner means to detect the signals of said source therein, said detected signals having variations therein according to the phase difference between the output signals of said channels, a phase comparison means coupled to the output of said detector means and the output of said source to produce a control signal in accordance with said variations and means responsive to said control signal to vary the phase of the signals of the other of said channels prior to the combining thereof to maintain the signals combined substantially in phase.

24. A diversity receiving system comprising a plurality of receiving channels, means included in each of said channels to render each of said channels responsive to a different one of a plurality of signals spaced in frequency, said plurality of signals being non-coincident in time, delay means included in at least one of said channels to render said plurality of signals time coincident, frequency converting means included in at least one of said channels to render the output signals of each of said channels equal in frequency, means coupled to the output of each of said channels to combine the output signals of each of said channels, a source of given signals, means responsive to the output of said source to modulate the signals of one of said channels prior to combining thereof, detector means coupled to the output of said combiner means to detect the signals of said source therein, said detected signals having variations therein according to the phase difference between the output signals of said channels, a phase comparison means coupled to the output of said detector means and the output of said source to produce a control signal in accordance with said variations and means responsive to said control signal to vary the phase of the signals of the other of said channels prior to the combining thereof to maintain the signals combined substantially in phase.

25. A diversity receiving system comprising a plurality of receiving channels, means included in each of said channels to render each of said channels responsive to a different one of a plurality of signals spaced in frequency, a frequency converting means included in at least one of said channels to render the output signals of each of said channels equal in frequency, means coupled to the output of each of said channels to combine the output signals of each of said channels, a source of given signals, an amplitude modulator in coupled relation with one of said channels to modulate the signal of said one of said channels in accordance with the output of said source, detector means coupled to the output of said combiner means to detect the signals of said source therein, said detected signals having variations therein according to the phase difference between the output signals of said channels, a phase comparison means coupled to the output of said detector means and the output of said source to produce a control signal in accordance with said variations and means responsive to said control signal to vary the phase of the signals of the others of said channels prior to the combining thereof to maintain the signals combined substantially in phase.

26. A diversity receiving system comprising a plurality of receiving channels, means included in each of said channels to render each of said channels responsive to a different one of a plurality of signals spaced in frequency, said plurality of signals being non-coincident in time, delay means included in at least one of said channels to render said plurality of signals time coincident, a frequency converting means included in at least one of said channels to render the output signals of each of said channels equal in frequency, means coupled to the output of each of said channels to combine the output signals of each of said channels, a source of given signals, an amplitude modulator in coupled relation with one of said channels to modulate the signal of said one of said channels in accordance with the output of said source, detector means coupled to the output of said combiner means to detect the signals of said source therein, said detected signals having variations therein according to the phase difference between the output signals of said channels, a phase comparison means coupled to the output of said detector means and the output of said source to produce a control signal in accordance with said variations and means responsive to said control signal to vary the phase of the signals of the others of said channels prior to the combining thereof to maintain the signals combined substantially in phase.

27. A diversity receiving system comprising a plurality of receiving channels, means included in each of said channels to render each of said channels responsive to a different one of a plurality of signals spaced in frequency, a frequency converting means included in at least one of said channels to render the output signals of each of said channels equal in frequency, means coupled to the output of each of said channels to combine the output signals of each of said channels, a source of given signals, a frequency modulator in coupled relation with one of said channels to modulate the signal of said one of said channels in accordance with the output of said source, detector means coupled to the output of said combiner means to detect the signals of said source therein, said detected signals having variations therein according to the phase difference between the output signals of said channels, a phase comparison means coupled to the output of said detector means and the output of said source to produce a control signal in accordance with said variations and means responsive to said control signal to vary the phase of the signals of the others of said channels prior to the combining thereof to maintain the signals combined substantially in phase.

28. A diversity receiving system comprising a plurality of receiving channels, means included in each of said channels to render each of said channels responsive to a different one of a plurality of signals spaced in frequency, said plurality of signals being non-coincident in time, delay means included in at least one of said channels to render said plurality of signals time coincident, a frequency converting means included in at least one of said channels to render the output signals of each of said channels equal in frequency, means coupled to the output of each of said channels to combine the output signals of each of said channels, a source of given signals, a frequency modulator in coupled relation with one of said channels to modulate the signal of said one of said channels in accordance with the output of said source, detector means coupled to the output of said combiner means to detect the signals of said source therein, said detected signals having variations therein according to the phase difference between the output signals of said channels, a phase comparison means coupled to the output of said detector means and the output of said source to produce a control signal in accordance with said variations and means responsive to said control signal to vary the phase of the signals of the others of said channels prior to the combining thereof to maintain the signals combined substantially in phase.

29. A diversity receiving system comprising a plurality of receiving channels, mixing means included in each of said channels, generating means to produce an oscillating signal for each of said mixing means to cooperate therein with the signal of said channel to produce a difference signal, the difference signal of each of said channels having the same frequency, means coupled to said mixing means to combine said difference signals, a source of given signals coupled to said generating means to modulate one of said oscillating signals, detector means coupled to the output of said combiner means to detect the signals of said source, said detected signals having variation therein according to the phase difference between said difference signals, a phase comparison means coupled to the output of said detector means and the output of said source to produce a control signal in accordance with said variations and means to couple said control signal to said generating means to vary the phase of the other of said oscillating signals to maintain said difference signal substantially in phase.

30. A diversity receiving system comprising a plurality of receiving channels, means included in each of said channels to render each of said channels responsive to a different one of a plurality of signals spaced in frequency, mixing means included in each of said channels, an oscillator for each of said mixing means, the oscillations of the oscillators cooperating in their respective mixing means with the signals of said channels to produce a difference signal, the difference signal of each of said channels having the same frequency, means coupled to said mixing means to combine said difference signals, a source of given signals coupled to one of said oscillators to frequency modulate the oscillations thereof, an amplitude detector means coupled to the output of said combiner means to detect the signals of said source, said detected signals having variations therein according to the phase difference between said difference signals, a phase comparison means coupled to the output of said detector means and the output of said source to produce a control signal in accordance with said variations and means to couple said control signal to said other of said oscillators to vary the phase of the output signals thereof to maintain said difference signals substantially in phase.

31. A diversity receiving system comprising a plurality of receiving channels, means included in each of said channels to render each of said channels responsive to a different one of a plurality of signals spaced in frequency, said plurality of signals being non-coincident in time, delay means included in at least one of said channels to render said plurality of signals time coincident, mixing means included in each of said channels, an oscillator for each of said mixing means, the oscillations of the oscillators cooperating in their respective mixing means with the signals of said channel to produce a difference signal, the difference signal of each of said channels having the same frequency, means coupled to said mixing means to combine said difference signals, a source of given signals coupled to one of said oscillators to frequency modulate the oscillations thereof, an amplitude detector means coupled to the output of said combiner means to detect the signals of said source, said detected signals having variations therein according to the phase difference between said difference signals, a phase comparison means coupled to the output of said detector means and the output of said source to produce a control signal in accordance with said variations and means to couple said control signal to said other of said oscillators to vary the phase of the output signals thereof to maintain said difference signals substantially in phase.

32. A diversity receiving system comprising a plurality of receiving channels, means included in each of said channels to render each of said channels responsive to a different one of a plurality of signals spaced in frequency, mixing means included in each of said channels, an oscillator having an oscillating signal output for each of said mixing means, the oscillating signals cooperating in their respective mixing means with the signals of said channel to produce a difference signal, the difference signal of each of said channels having the same frequency, means coupled to said mixing means to combine said difference signals, a modulator coupled to one of the oscillating signal outputs of said oscillator, a source of given signals coupled to said modulator to frequency modulate said one of the oscillating signal outputs, a phase shifter coupled to the others of the oscillating signal outputs of said oscillator, an amplitude detector means coupled to the output of said combiner means to detect the signals of said source, said detected signals having variations therein according to the phase difference between said difference signals, a phase comparison means coupled to the output of said detector means and the output of said source to produce a control signal in accordance with said variations and means to couple said control signal to said phase shifter to vary the phase of said others of the oscillating signal outputs to maintain said difference signals substantially in phase.

33. A diversity receiving system comprising a plurality of receiving channels, means included in each of said channels to render each of said channels responsive to a different one of a plurality of signals spaced in frequency, said plurality of signals being non-coincident in time, delay means included in at least one of said channels to render said plurality of signals time coincident, mixing means included in each of said channels, an oscillator having an oscillating signal output for each of said mixing means, the oscillating signals cooperating in their respective mixing means with the signals of each of said channels having the same frequency, means coupled to said mixing means to combine said difference signals, a modulator coupled to one of the oscillating signal outputs of said oscillator, a source of given signals coupled to said modulator to frequency modulate said one of the oscillating signal outputs, a phase shifter coupled to the others of the oscillating signal outputs of said oscillator, an amplitude detector means coupled to the output of said combiner means to detect the signals of said source, said detected signals having variations therein according to the phase difference between said difference signals, a phase comparison means coupled to the output of said detector means and the output of said source to produce a control signal in accordance with said variations and means to couple said control signal to said phase shifter to vary the phase of said others of the oscillating signal outputs to maintain said difference signals substantially in phase.

34. An automatic phase control system comprising a first and second source of signals, generating means to produce two oscillating signals, first mixing means to mix the output of said first source of signals and one of the oscillating signals of said generating means to produce a first difference signal, second mixing means to mix the output of said second source of signals and the other oscillating signal of said generating means to produce a second difference signal, the frequency of said oscillating signals being related to each other and the signals of said first and second sources to render said first and second difference signals equal in frequency, means coupled to said mixing means to combine said difference signals, a third source of given signals coupled to said generating means to modulate said one of the oscillating signals, detector means coupled to the output of said combiner means to detect the signals of said third source, said detected signals having variations therein according to the phase difference between the signals of said first and second sources, a phase comparison means coupled to the output of said detector means and the output of said third source to produce a control signal in accordance with said variations and means to couple said control signal to said generating means to vary the phase of said other of the oscillating signals to maintain said first and second difference signals substantially in phase.

35. An automatic phase control system comprising a first and second source of signals, the signals of said first and second sources being spaced in frequency, two oscillators, first mixing means to mix the output of said first source of signals and the output signals of one of said oscillators to produce a first difference signal, second mixing means to mix the output of said second source of signals and the output signals of the other of said oscillators to produce a second difference signal, the frequency of said output signals of said oscillators being related to each other and the signals of said first and second sources to render said first and second difference signals equal in frequency, means coupled to said mixing means to combine said difference signals, a third source of given signals coupled to said one of said oscillators to modulate the output signals thereof, detector means coupled to the output of said combiner means to detect the signals of said third source, said signals having variations therein according to the phase difference between the signals of said first and second sources, a phase comparison means coupled to the output of said detector means and the output of said third source to produce a control signal in accordance with said variations and means to couple said control signal to said other of said oscillators to vary the phase of the output signals thereof to maintain said first and second difference signals substantially in phase.

36. An automatic phase control system comprising a first and second source of signals, the signals of said first and second sources being spaced in frequency and noncoincident in time, delay means coupled to the output of at least one of said sources of signals to render the signals thereof time coincident, two oscillators, first mixing means to mix the output of said first source of signals and the output signals of one of said oscillators to produce a first difference signal, second mixing means to mix the output of said second source of signals and the output signals of the other of said oscillators to produce a second difference signal, the frequency of said output signals of said oscillators being related to each other and the signals of said first and second sources to render said first and second difference signals equal in frequency, means coupled to said mixing means to combine said difference signals, a third source of given signals coupled to said one of said oscillators to modulate the output signals thereof, detector means coupled to the output of said combiner means to detect the signals of said third source, said detected signals having variations therein according to the phase difference between the signals of said first and second sources, a phase comparison means coupled to the output of said detector means and the output of said third source to produce a control signal in accordance with said variations and means to couple said control signal to said other of said oscillators to vary the phase of the output signals thereof to maintain said first and second difference signals substantially in phase.

37. An automatic phase control system comprising a first and second source of signals, the signals of said first and second sources being spaced in frequency, an oscillator having two oscillating outputs, a phase shifter coupled to one oscillating output of said oscillator, a modulator coupled to the other oscillating output of said oscillator, first mixing means to mix the output of said first source of signals and the output of said phase shifter to produce a first difference signal, second mixing means to mix the output of said second source of signals and the output of said modulator to produce a second difference signal, the frequency of said output signals of said oscillators being related to each other and the signals of said first and second sources to render said first and second difference signals equal in frequency, means coupled to said mixing means to combine said difference signals, a third source of given signals coupled to said modulator to modulate said other oscillating output, detector means coupled to the output of said combiner means to detect the signals of said third source, said detected signals having variations therein according to the phase difference between the signals of said first and second sources, a phase comparison means coupled to the output of said detector means and the output of said third source to produce a control signal in accordance with said variations and means to couple said control signal to said phase shifter to vary the phase of said one oscillating output to maintain said first and second difference signals substantially in phase.

38. An automatic phase control system comprising a first and second source of signals, the signals of said first and second sources being spaced in frequency and noncoincident in time, delay means coupled to the output of at least one of said sources of signals to render the signals thereof time coincident, an oscillator having two oscillating outputs, a phase shifter coupled to one oscillating output of said oscillator, a modulator coupled to the other oscillating output of said oscillator, first mixing means to mix the output of said first source of signals and the output of said phase shifter to produce a first difference signal, second mixing means to mix the output of said second source of signals and the output of said modulator to produce a second difference signal, the frequency of said output signals of said oscillators being related to each other and the signals of said first and second sources to render said first and second difference signals equal in frequency, means coupled to said mixing means to combine said difference signals, a third source of given signals coupled to said modulator to modulate said other oscillating output, detector means coupled to the output of said combiner means to detect the signals of said third source, said detected signals having variations therein according to the phase differences between the signals of said first and second sources, a phase comparison means coupled to the output of said detector means and the output of said third source to produce a control signal in accordance with said variations and means to couple said control signals to said phase shifter to vary the phase of said one oscillating output to maintain said first and second difference signals substantially in phase.

References Cited in the file of this patent

UNITED STATES PATENTS

| | | |
|---|---|---|
| 2,505,266 | Villem | Apr. 25, 1950 |
| 2,510,095 | Frankel | June 6, 1950 |
| 2,683,213 | Earp | July 6, 1954 |